Figures 1, 2:
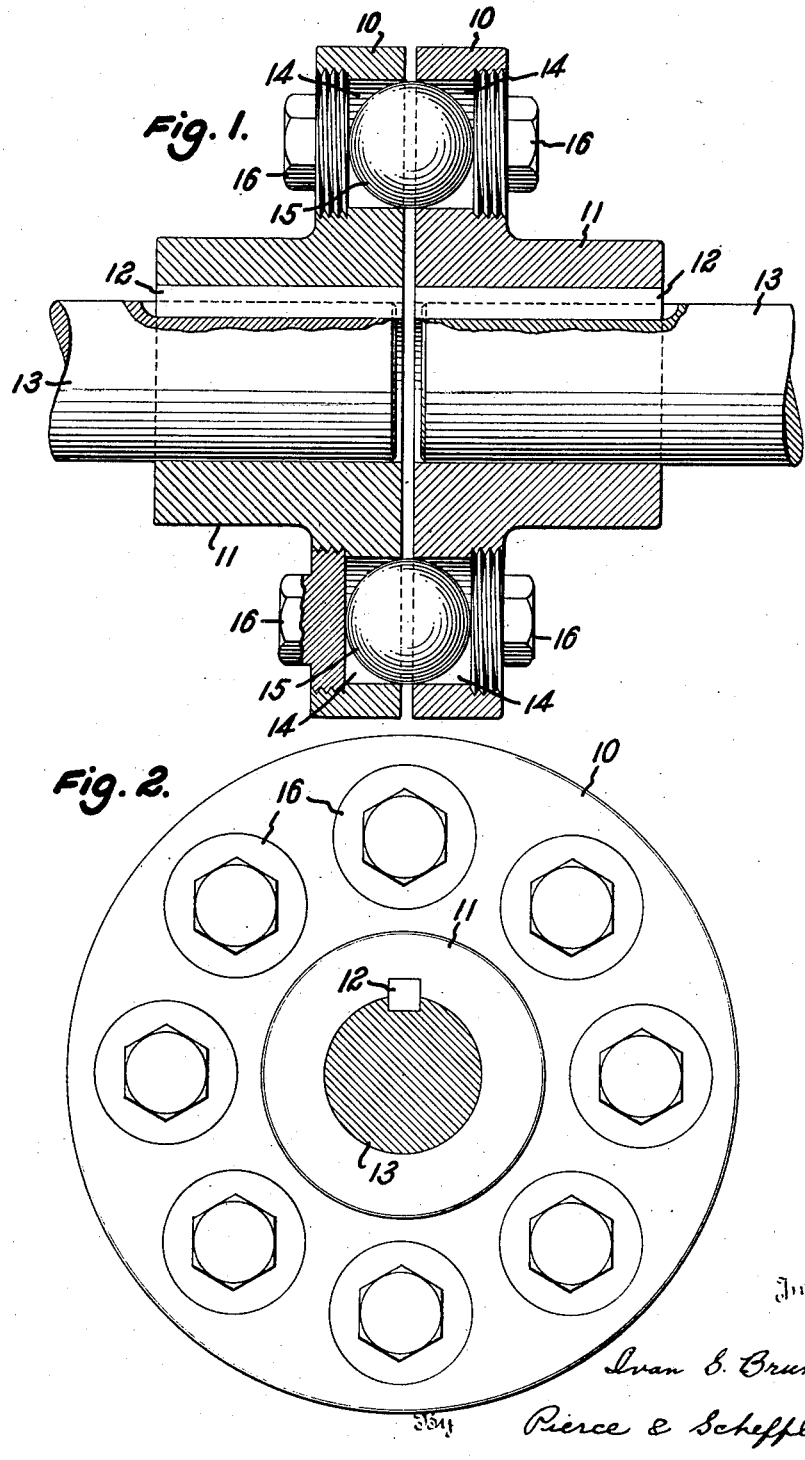

Aug. 10, 1943.  I. S. BRUMAGIM  2,326,201

FLEXIBLE COUPLING

Filed Nov. 14, 1942

Inventor:
Ivan E. Brumagim
Pierce & Scheffler,
his attorneys.

Patented Aug. 10, 1943

2,326,201

UNITED STATES PATENT OFFICE 2,326,201

FLEXIBLE COUPLING

Ivan S. Brumagim, North Warren, Pa.

Application November 14, 1942, Serial No. 465,621

4 Claims. (Cl. 64—11)

This invention relates to flexible shaft couplings.

A principal purpose of the invention is the provision of a flexible coupling construction for the joining of rotating power transmission shafts.

Another object of the invention is the provision of a flexible coupling which will have a minimum of thrust in the axial direction.

A further object of the invention is the provision of a flexible coupling which can be keyed to the ends of the shafts in the manner commonly used for shaft couplings and which can be disconnected and serviced without displacement of the shafts.

The new flexible coupling construction of the invention comprises paired parallel members, preferably disc-shaped, adapted to be attached to the ends of shafts, preferably by keying the members to the shafts, the members having opposed plane faces provided with recesses cooperating to form a plurality of right cylindrical chambers having their axis parallel to the axis of the coupling and having a length approximately equal to their diameter and spherical elastic balls having a diameter approximately equal to the diameter of the cylindrical chambers positioned therein. Preferably the end walls of the cylindrical chambers are formed by plug members removably positioned in the coupling members, for example, by means of screw threads, so that the elastic balls may be removed from the cylindrical chambers without disconnecting the coupling members from the shafts.

The invention will be more particularly described, for the purpose of illustrating the principles thereof, with reference to the accompanying drawing in which:

Fig. 1 is an axial view in partial section of a coupling embodying the principles of the invention; and Fig. 2 is an end view of the coupling of Fig. 1.

In the drawing, 10 are paired identical disc members, having hub portions 11 provided with slots 12 for keying the disc members to the shafts 13 to be coupled. In the opposed faces of each of the disc members 10 are a plurality of right cylindrical recesses 14, each having a depth of approximately one-half their diameter so that the recesses in the opposing disc members cooperate to form a plurality of right cylindrical chambers having their axes parallel to the axis of the disc members and having an axial length approximately equal to their diameters.

In each of the cylindrical chambers is positioned a spherical ball 15 of elastic material, such as rubber or rubber-like material. The diameters of the spherical balls are approximately equal to the diameters of the cylindrical chambers.

Preferably, the end walls of the cylindrical chambers are provided by removable plug members 16, screw threaded into the discs 10.

The provision of spherical elastic balls in right cylindrical chambers of approximately the same diameter as the balls insures that the plane of torque application is always perpendicular to the axis of the shafts, thereby greatly reducing end thrust parallel to the shafts.

The provision of the removable plug members 16 makes it possible to remove and replace the elastic balls without altering either of the alinement of the shafts or the connection of the coupling discs thereto.

I claim:

1. A shaft coupling comprising paired parallel disc members adapted to be attached to the ends of shafts to be coupled and having opposed plane faces provided with recesses cooperating to form a plurality of right cylindrical chambers having their axes parallel to the axis of the coupling, and spherical elastic balls having a diameter approximately equal to the diameter of said chambers positioned therein.

2. A shaft coupling comprising paired parallel disc members adapted to be attached to the ends of shafts to be coupled and having opposed plane faces provided with recesses cooperating to form a plurality of right cylindrical chambers having their axes parallel to the axis of the coupling and having a length approximately equal to their diameter, and spherical elastic balls having a diameter approximately equal to the diameter of said chambers positioned therein.

3. A shaft coupling comprising paired parallel disc members adapted to be keyed to the ends of shafts to be coupled and having opposed plane faces provided with recesses cooperating to form a plurality of right cylindrical chambers having their axes parallel to the axis of the coupling and having a length approximately equal to their diameter, and spherical elastic balls having a diameter approximately equal to the diameter of said chambers positioned therein.

4. A shaft coupling comprising paired parallel disc members adapted to be attached to the ends of shafts to be coupled and having opposed plane faces provided with recesses cooperating to form a plurality of right cylindrical chambers having their axes parallel to the axis of the coupling and having a length approximately equal to their diameter, spherical elastic balls having a diameter approximately equal to the diameter of said chambers positioned therein, and removable plug members in said disc members forming the end walls of said cylindrical chambers.

IVAN S. BRUMAGIM.